US008607358B1

(12) United States Patent
Shankar et al.

(10) Patent No.: US 8,607,358 B1
(45) Date of Patent: *Dec. 10, 2013

(54) STORING ENCRYPTED OBJECTS

(75) Inventors: Umesh Shankar, New York, NY (US); Andrei Kulik, Zurich (CH); Bodo Moller, Adliswil (CH); Sarvar Patel, Montville, NJ (US)

(73) Assignee: Google Inc., Mountain View, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 13/110,323

(22) Filed: May 18, 2011

Related U.S. Application Data

(60) Provisional application No. 61/346,005, filed on May 18, 2010.

(51) Int. Cl.
*H04L 29/06* (2006.01)

(52) U.S. Cl.
USPC ...... 726/27; 726/5; 726/6; 713/150; 713/153; 380/277; 380/278; 380/279

(58) Field of Classification Search
USPC .................. 726/5, 6, 27; 380/277, 278, 279; 713/150, 153
See application file for complete search history.

(56) References Cited

U.S. PATENT DOCUMENTS

| | | | |
|---|---|---|---|
| 5,335,346 A | 8/1994 | Fabbio | |
| 5,778,222 A | 7/1998 | Herrick et al. | |
| 6,119,230 A | 9/2000 | Carter | |
| 6,529,885 B1 * | 3/2003 | Johnson | 705/64 |
| 6,577,734 B1 * | 6/2003 | Etzel et al. | 380/277 |
| 6,751,735 B1 * | 6/2004 | Schell et al. | 713/189 |
| 6,865,555 B2 * | 3/2005 | Novak | 705/59 |
| 6,947,556 B1 | 9/2005 | Matyas et al. | |
| 7,136,840 B2 * | 11/2006 | Pinkas et al. | 705/75 |
| 7,319,759 B1 * | 1/2008 | Peinado et al. | 380/277 |
| 7,373,517 B1 | 5/2008 | Riggins | |
| 7,512,810 B1 | 3/2009 | Ryan | |
| 7,600,134 B2 | 10/2009 | Catherman et al. | |
| 7,797,399 B1 | 9/2010 | Svendsen | |
| 7,913,300 B1 | 3/2011 | Flank et al. | |
| 8,024,559 B2 * | 9/2011 | Jung et al. | 713/155 |

(Continued)

OTHER PUBLICATIONS

Vishal Kher, Yongdae Kim, Securing distributed storage: challenges, techniques, and systems, Proceedings of the 2005 ACM workshop on Storage security and survivability, Nov. 11-11, 2005.*

(Continued)

*Primary Examiner* — Kambiz Zand
*Assistant Examiner* — Imhotep Durham
(74) *Attorney, Agent, or Firm* — Fish & Richardson P.C.

(57) ABSTRACT

A seed value is received and a resource encryption key is generated from the seed value. The resource encryption key may be sent to an application server such that the application server system is able to encrypt a resource using the resource encryption key. Authentication credentials and a wrapped key are received and the wrapped key is decrypted to generate an unwrapped key that includes the resource identifier, the resource encryption key, and the user identifier in unencrypted form. The user identifier is accessed from the unwrapped key it is determined that the received authentication credentials correspond to the accessed user identifier. The resource encryption key is sent in unencrypted form to the application server system such that the application server system can decrypt the resource using the resource encryption key in unencrypted form.

30 Claims, 9 Drawing Sheets

(56) References Cited

U.S. PATENT DOCUMENTS

| | | | |
|---|---|---|---|
| 8,046,509 B2 * | 10/2011 | Bondurant | 710/68 |
| 8,086,637 B1 | 12/2011 | Tsai et al. | |
| 8,295,490 B1 * | 10/2012 | McCoy et al. | 380/279 |
| 8,307,067 B2 | 11/2012 | Ryan | |
| 8,307,455 B2 * | 11/2012 | Takahashi et al. | 726/27 |
| 2002/0073113 A1 | 6/2002 | Caraher et al. | |
| 2003/0088786 A1 | 5/2003 | Moran et al. | |
| 2004/0107342 A1 | 6/2004 | Pham et al. | |
| 2005/0081066 A1 | 4/2005 | Lahdensivu et al. | |
| 2006/0005261 A1 * | 1/2006 | Sukigara et al. | 726/27 |
| 2006/0026425 A1 | 2/2006 | Douceur et al. | |
| 2007/0005595 A1 | 1/2007 | Gafter | |
| 2007/0156842 A1 | 7/2007 | Vermeulen et al. | |
| 2008/0301783 A1 * | 12/2008 | Abrutyn et al. | 726/5 |
| 2009/0049120 A1 | 2/2009 | Sakairi et al. | |
| 2009/0055397 A1 | 2/2009 | Man et al. | |
| 2009/0240907 A1 | 9/2009 | Crandell | |
| 2009/0327706 A1 * | 12/2009 | Ikeda et al. | 713/156 |
| 2010/0017596 A1 | 1/2010 | Schertzinger | |
| 2011/0191858 A1 | 8/2011 | Shapiro et al. | |
| 2011/0271353 A1 | 11/2011 | Li et al. | |

OTHER PUBLICATIONS

L. Seitz, J. Pierson and L. Brunie, "Key Management for Encrypted Data Storage in Distributed Systems", in Proceedings of the 2nd Security in Storage Workshop (SISW), 2003.*

Office Action for U.S. Appl. No. 13/245,393 dated May 29, 2012, 20 pages.

Office Action for U.S. Appl. No. 13/110,297 dated May 30, 2012, 18 pages.

Office Action for U.S. Appl. No. 13/110,297 dated Jan. 25, 2012.

Office Action for U.S. Appl. No. 13/245,393 dated Jan. 25, 2012.

Office Action for U.S. Appl. No. 13/110,361 dated Dec. 20, 2012, 15 pages.

Office Action for U.S. Appl. No. 13/110,306, dated Mar. 15, 2013, 18 pages.

Office Action for U.S. Appl. No. 13/110,336, dated Mar. 18, 2013, 17 pages.

Shankar, "Security and Data Integrity in Google Health," Powerpoint, May 2010, 30 pages.

* cited by examiner

STORING ENCRYPTED OBJECTS

CROSS-REFERENCE TO RELATED APPLICATION

The present application claims priority from U.S. Provisional Application Ser. No. 61/346,005, filed May 18, 2010. The contents of the prior application are incorporated herein by reference in their entirety.

TECHNICAL FIELD

This document relates to hosted storage and associated cryptographic key storage.

BACKGROUND

Hosted, or cloud-based storage, refers to off-site or remote data storage that is typically provided by a third party. The third party may implement the hosted storage in a data center, and provide access to the hosted storage over a network, such as the Internet.

Encryption is the process of converting data, sometimes called plaintext, using an algorithm and an encryption key to make it unreadable to anyone except those possessing the encryption key. The result of the process is encrypted information, sometimes called ciphertext.

SUMMARY

In a first aspect a method performed by one or more processors includes receiving, from an application server system and at a key server system, a seed value. The method includes generating, at the key server system, a resource encryption key from the seed value. The method includes sending, from the key server system to the application server system, the resource encryption key such that the application server system is able to encrypt a resource using the resource encryption key. The method includes receiving, from the application server system and at the key server system, authentication credentials and a wrapped key. The wrapped key including a resource identifier, a resource encryption key, and a user identifier that have been encrypted using a master key. The resource identifier identifies the resource encrypted with the resource encryption key and the user identifier identifies a user that is permitted to use the resource encryption key to decrypt the resource. The method includes decrypting the wrapped key to generate an unwrapped key that includes the resource identifier, the resource encryption key, and the user identifier in unencrypted form. The method includes accessing the user identifier from the unwrapped key. The method includes determining that the received authentication credentials correspond to the accessed user identifier. The method includes in response to determining that the received authentication credentials correspond to the accessed user identifier, sending the resource encryption key in unecrypted form to the application server system such that the application server system can decrypt the resource using the resource encryption key in unencrypted form.

In a second aspect, a computer system includes a key server system configured to receive, from an application server system and at a key server system, a seed value. The key server system is configured to generate, at the key server system, a resource encryption key from the seed value. The key server system is configured to send, from the key server system to the application server system, the resource encryption key such that the application server system is able to encrypt a resource using the resource encryption key. The key server system is configured to receive, from the application server system and at the key server system, authentication credentials and a wrapped key. The wrapped key includes a resource identifier, a resource encryption key, and a user identifier that have been encrypted using a master key. The resource identifier identifies the resource encrypted with the resource encryption key and the user identifier identifies a user that is permitted to use the resource encryption key to decrypt the resource. The key server system is configured to decrypt the wrapped key to generate an unwrapped key that includes the resource identifier, the resource encryption key, and the user identifier in unencrypted form. The key server system is configured to access the user identifier from the unwrapped key. The key server system is configured to determine that the received authentication credentials correspond to the accessed user identifier. The key server system is configured to, in response to determining that the received authentication credentials correspond to the accessed user identifier, send the resource encryption key in unecrypted form to the application server system such that the application server system can decrypt the resource using the resource encryption key in unencrypted form.

In a third aspect, a computer readable medium stores operations that, when executed by one or more processing devices, cause the one or more processing devices to perform operations including receiving, from an application server system and at a key server system, a seed value. The operations include generating, at the key server system, a resource encryption key from the seed value. The operations include sending, from the key server system to the application server system, the resource encryption key such that the application server system is able to encrypt a resource using the resource encryption key. The operations include receiving, from the application server system and at the key server system, authentication credentials and a wrapped key. The wrapped key including a resource identifier, a resource encryption key, and a user identifier that have been encrypted using a master key. The resource identifier identifies the resource encrypted with the resource encryption key and the user identifier identifies a user that is permitted to use the resource encryption key to decrypt the resource. The operations include decrypting the wrapped key to generate an unwrapped key that includes the resource identifier, the resource encryption key, and the user identifier in unencrypted form. The operations include accessing the user identifier from the unwrapped key. The operations include determining that the received authentication credentials correspond to the accessed user identifier. The operations include, in response to determining that the received authentication credentials correspond to the accessed user identifier, sending the resource encryption key in unecrypted form to the application server system such that the application server system can decrypt the resource using the resource encryption key in unencrypted form.

Implementations of the foregoing aspects can include any, all or none of the following features. A service associated with the wrapped key may be identified and decrypting the wrapped key may include decrypting the wrapped key using a master key associated with the service.

A sharing request may be received from the application server and at the key server system. The sharing request that may include i) the authentication credentials, ii) the wrapped key, and iii) a second user identifier. Decrypting the wrapped key included in the request may be decrypted to generate the unwrapped key and the user identifier may be accessed from the unwrapped key. It may be determined that the received authentication credentials correspond to the accessed user identifier and, in response to determining that the received authentication credentials correspond to the accessed user identifier, the user identifier in the unwrapped key may be replaced with the second user identifier and the unwrapped key may be encrypted to generate a second wrapped key. The second wrapped key may be sent to the application server system.

The user identifier may indicate no more than one user. A format of the authentication credentials and the user identifier may be identified and it may be determined that the received authentication credentials correspond to the accessed user identifier according to the identified format.

The resource may be encrypted using the resource encryption key to generate an encrypted version of the resource. Duplicates of the encrypted version of the resource store may be detected in a storage system and the detected duplicates may be removed from the storage system. Removing the detected duplicates from the storage system may include deleting the detected duplicates and replacing the deleted duplicates with a pointer to the encrypted version of the resource. Encrypting the resource using the resource encryption key to generate the encrypted version of the resource may include encrypting the resource using the resource encryption key and a deterministic encryption technique. The seed value may based on the resource and may be a hash calculated from the resource.

The details of one or more implementations are set forth in the accompanying drawings and the description below. Other features and advantages will be apparent from the description and drawings, and from the claims.

DETAILED DESCRIPTION

A hosted storage system can provide data storage for a variety of applications. The hosted data storage can receive data resources, associate the resources with user accounts, and provide access to the resources to authorized users. A system of buckets can be used to index the data storage space, and permission properties can be assigned to the buckets or to the resources stored in the buckets.

The resources stored in the buckets can be encrypted with resource encryption keys held in wrapped keys. Access to the resource encryption key can be provided by a keystore server that can ensure a user of the application server has authorization to access the resource encryption key. If the user is authorized, the keystore server can unwrap the wrapped key and provide the resource encryption key to the application server. The keystore need not store any of the wrapped keys, instead only having access to a wrapped key when receiving a request to unwrap it.

Figure 1A:
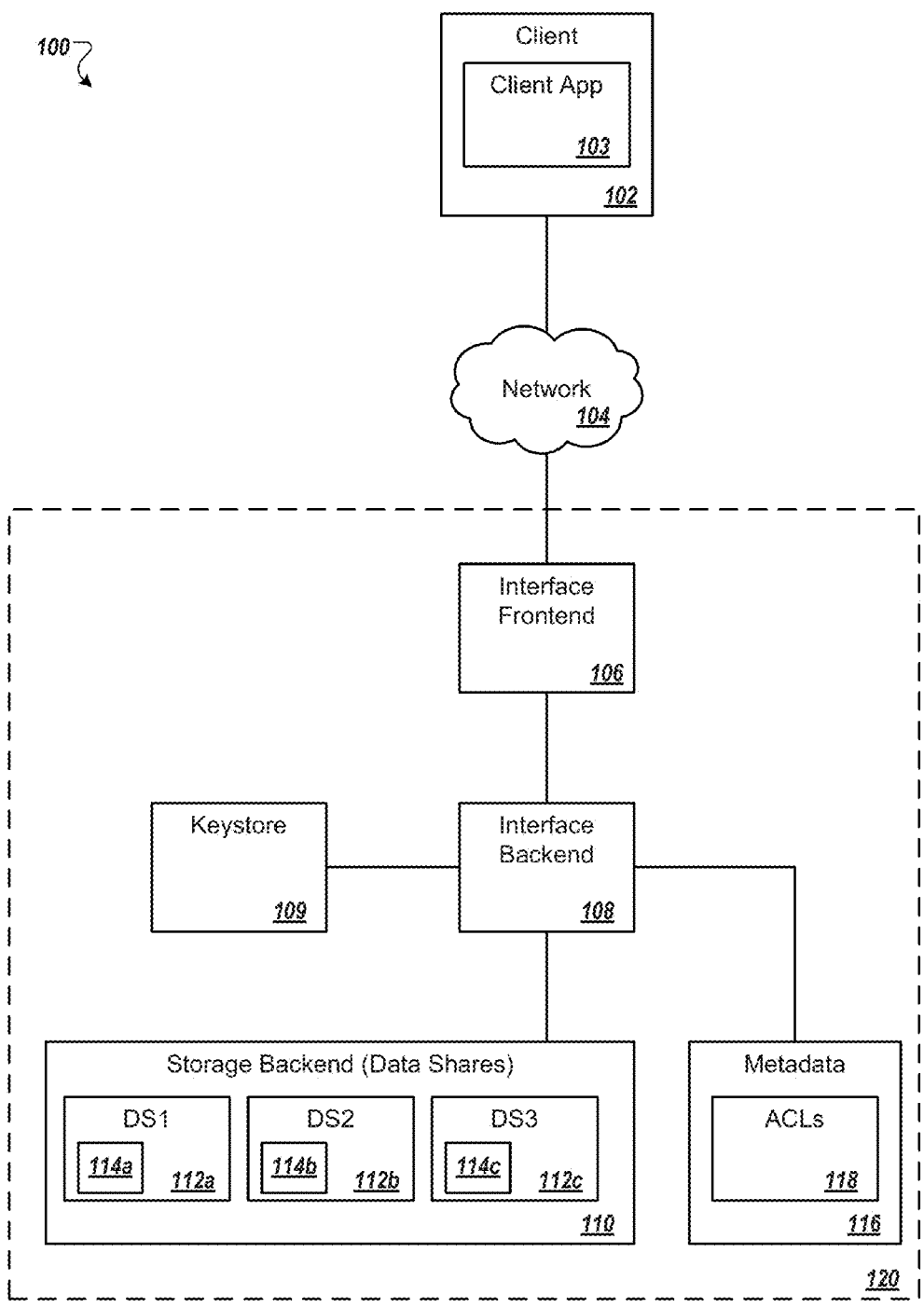
FIG. 1A is a block diagram showing an example of a system for providing hosted storage and accessing the hosted storage from a client device.

FIG. 1A is a block diagram showing an example of a system 100 for providing hosted storage and accessing the hosted storage from a client device 102. System 100 is one example of a system that can employ a keystore for using wrapped keys, but other types of systems, providing other types of services, can employ a keystore for using wrapped keys. In some implementations, a hosted storage service 120 can provide access to stored data by applications running on computing devices geographically separate from each other, provide offsite data backup and restore functionality, provide data storage to a computing device with limited storage capabilities, and/or provide storage functionality not implemented on a computing device.

The system 100 can provide scalable stores for storing data resources. The client device 102 can upload data resources to the hosted storage service 120 and control access to the uploaded data resources. Access control can include a range of security levels, from keeping data securely confidential to publishing it without restrictions. Data stored in hosted storage service 120 can be secured from unauthorized access. The hosted storage service 120 can use a simple and consistent application programming interface, or API, which can allow arbitrary quantities of structured or unstructured data to be kept private or shared between individuals, organizations, or with the world at large. The client device 102 can store data in the hosted storage service 120 for mutual business reasons (e.g., submission of work product ordered by the owner of the hosted storage service 120), or for use in data processing by other services (e.g., images uploaded are used to automatically and dynamically create a photo gallery web page.)

Figure 8:
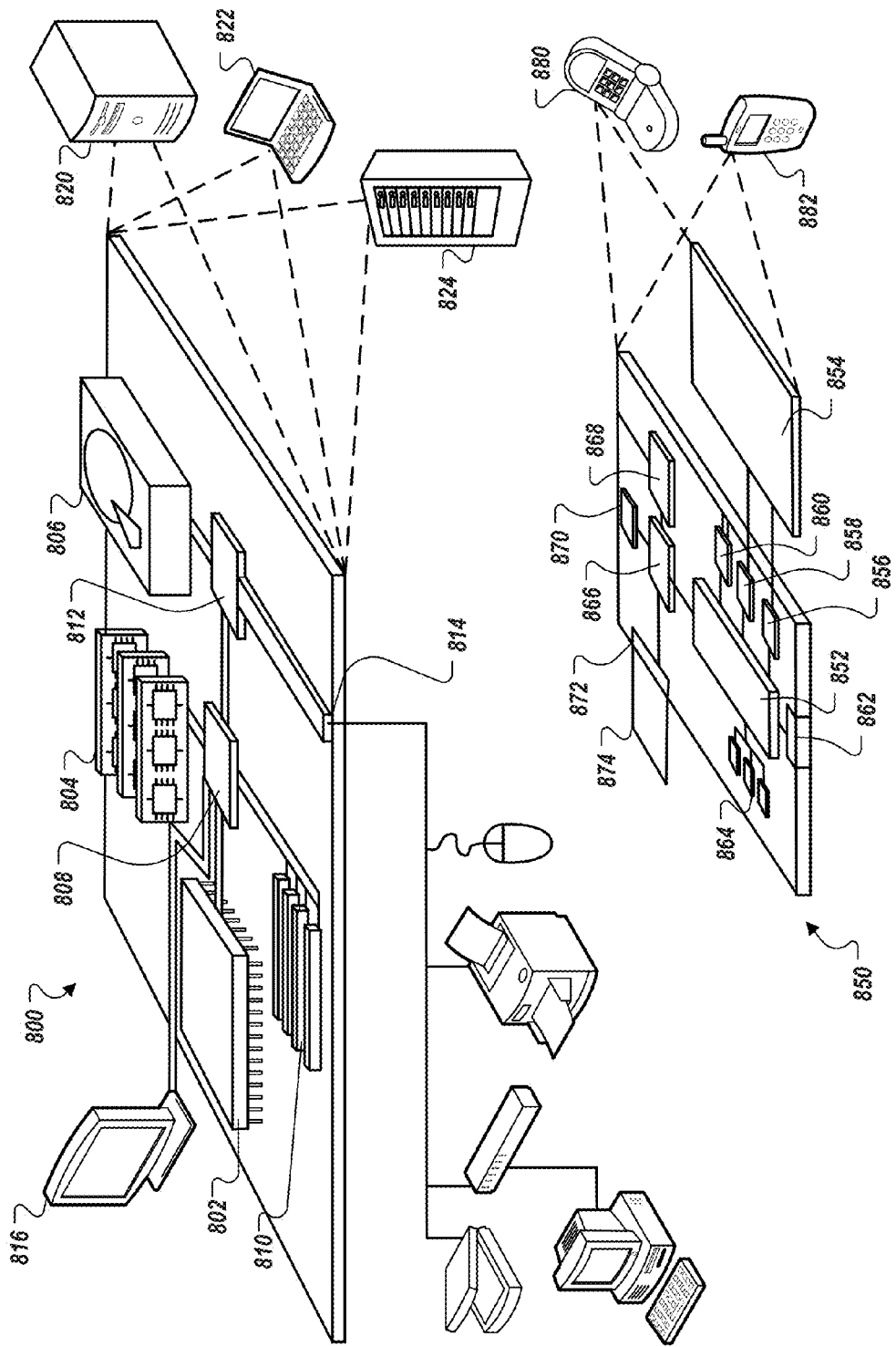
FIG. 8 shows an example of a computing device and a mobile computing device that can be used in connection with computer-implemented methods and systems described in this document.

The client device 102 can be implemented using a computing device, such as the computing device 800 or the mobile device 850 described with respect to FIG. 8. The client device 102 can communicate with the hosted storage service 120 via a network 104, such as the Internet. The client device 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the network 104 with the hosted storage service 120 and/or other services and devices.

The hosted storage service 120 can be implemented such that client applications such as a client application 103 can store, retrieve, or otherwise manipulate data resources in the hosted storage service 120. The hosted storage service 120 can be implemented by one or more server devices, which can be implemented using a computing device, such as the computing device 800 or mobile device 850 described with respect to FIG. 8. For example, the hosted storage service 120 can be implemented by multiple server devices operating in the same, or different, data centers.

The hosted storage service 120 generally includes an interface frontend 106, an interface backend 108, a storage backend 110, metadata 116 for resources stored in the storage backend 110, and a keystore 109. In general, the interface frontend 106 may receive requests from and send responses to the client device 102. For instance, the hosted storage service 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 106 can receive messages from the client 102 and parse the request into a format usable by the hosted storage service 120, such as a remote procedure call (RPC) to an interface backend 108. The interface frontend 106 writes responses generated by the hosted storage service 120 for transmission to the client 102. In some implementations, multiple interface frontends 106 are implemented, for example to support multiple access protocols.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data resource is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve a resource, while the HEAD verb may be used to retrieve information about a resource without retrieving the resource itself. The DELETE verb may be used to delete a resource from the hosted storage service 120. The PUT and POST verbs may be used to upload a resource to the service 120. PUT requests can come from the client 102 and contain authentication and authorization credentials and resource metadata in a header, such as an HTTP header. POST requests can be received when a client 102 wants to upload from a web browser form. The form POST upload protocol for the hosted storage service 120 can involve multiple required form fields to provide authentication, authorization and resource metadata. More generally, any of the API requests may include credentials for authentication and authorization, for example, in a header of the request. For example, an authorization header may be included in the REST requests, which include an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage service 120 (e.g., if the organization operating the hosted storage service 120 also operates other web services such as email service.) A user can also or alternatively be authenticated based on authentication credentials from an external credentialing service or an external service that includes credentialing functionality. User or group identifier information can be calculated from the external service's credential information. Requests sent by the client 102 to the interface frontend 106 can be translated and forwarded to the external service for authentication.

In general, resources stored in the hosted storage service 120 can be referenced by resource identifiers. The hosted storage service 120 can define namespaces to which a valid resource identifier must conform. For example, the namespace may require that resource identifiers be a sequence of Unicode characters whose UTF-8 encoding is at most 1024 bytes long. As another example, the namespace may require that resource identifiers be globally unique identifiers (GUIDs), which may be 128-bit integers.

Resources can be stored in hosted storage service 120 in buckets. In some examples, each bucket is uniquely named in the hosted storage service 120, each resource is uniquely named in a bucket, and every bucket and resource combination is unique. Resources may be uniquely identified by a URI that includes the bucket name and the resource name, and identifies the hosted storage service 120. For example, a resource named "long/song.mp3" in a bucket named "music" could be specified using a URI pattern such as http://s.hostedstoragesystem.com/music/long/song.mp3 or http://music-.s.hostedstoragesystem.com/long/song.mp3. Alternatively, the user of the client 102 can create a bucket named www-.music.org, publish a CNAME alias redirecting that to http://music.s.hostedstoragesystem.com, and address the resource as http://www.music.org/long/song.mp3. In some examples, buckets do not nest.

The interface backend 108 can handle request authentication and authorization, can manage data and metadata, and can track activity such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage service 120 (internal users). Such features can include those needed for administrative tasks (e.g., resolving a resource reference to a low level disk address.) The interface backend 108 can handle request authentication (e.g., ensuring a user's credentials are valid) and authorization (e.g., verifying that a requested operation is permitted.) The interface backend can also provide encryption and decryption services to prevent unauthorized access to data, even by internal users.

The interface backend 108 can manage metadata 116 associated with data resources, for example in a structured data format such as a database (e.g., MySQL or BigTable). User-specified names labeling the buckets can be completely defined within the metadata 116, and resource metadata 116 can map a resource name to one or more data shares 112 storing the resource. The metadata 116 can also contain bucket and resource creation times, resource sizes, hashes, and access control lists 118 (ACL 118) for both buckets and resources. The interface backend 108 can log activity and track storage consumption to support accounting for billing and chargebacks. In some examples, this includes quota monitoring in each dimension in which customers are charged (e.g., reads, writes, network transfers, total storage in use.)

The ACLs 118 define who is authorized to perform actions on corresponding buckets or resources, and the nature of the permitted actions. The ACLs 118 can be an unordered list of {scope, role} pairs, plus Boolean flags. The scope may define a user or group of users and the role may define the access permissions for the user or group. In some examples, the union of all {scope, role} pairs can define access rights. In some examples, more specific {scope, role} pairs override more general ones. Table 1: Bucket Roles below shows a list of example roles that can be included in ACLs 118 for buckets. Table 2: Resource Roles below shows a list of example roles that can be included in ACLs 118 for data resources.

TABLE 1

Bucket Roles

| Role | Capabilities |
| --- | --- |
| READ | Can list the bucket's contents. Cannot create or delete resources. |
| WRITE | READ capabilities plus ability to create and delete resources in the bucket. |
| FULL_CONTROL | WRITE capabilities plus ability to read and write the bucket ACL. |

TABLE 2

Resource Roles

| Role | Capabilities |
| --- | --- |
| READ | Can read the resource. |
| FULL_CONTROL | READER capabilities plus ability to read and write the resource ACL. |

Scopes can be defined to a single user or a group of users. In one implementation, those users with a FULL_CONTROL role (and therefore able to modify the ACL for a given bucket or resource) may define a group of users, and then provide a role for the group. For example, a group of users may be managed by the hosted storage service 120 (or, more generally, by the service provider that provides the hosted storage service 120) for reasons other than storage permissions (for example, for a message board or other service that employs groups) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of resources, or the ACL is otherwise associated with multiple resources, the role with respect to those resources can be easily changed by simply changing the role of the group.

Table 3: Scopes below shows a list of example scopes that can be included in ACLs 118 for buckets and/or data resources.

TABLE 3

Scopes

| Name | Description |
| --- | --- |
| Service ID | A single authenticated user specified by username. |
| Email Address | A single user specified by an email address. |
| Service Group ID | A group of users managed by the hosted storage service 120 and specified by an associated identifier. |
| Invite Token | One or more users with access to a one time use digital token. |
| Group-Restricted Key | One or more users with access to a permanent use digital key. |
| All Service Users | All authenticated users of the hosted storage service 120. |
| All Users | All users, no authentication. Can be anonymous or semi-anonymous. |

The FULL_CONTROL role can represent all possible capabilities, such as those assigned to a resource or bucket owner connected to a financially responsible party. The bucket owner can be configured to always have FULL_CONTROL for the bucket. In general, the bucket and/or resource owner can create or modify scopes and roles in the corresponding ACLs, but in some implementations the pair {bucket owner, FULL_CONTROL} may be prevented from being removed from the bucket ACL 118 (or the resource ACL). To create a resource, a user can have write permission on the bucket, which can be granted by WRITE and FULL_CONTROL. WRITE permission on the bucket can imply permission to delete or overwrite a resource in the bucket. Additional constraints can disallow certain modifications to ACLs 118. In some examples, it is possible to create a resource that the bucket owner cannot read.

A given ACL 118 can include a resource encryption key for an encrypted data resource associated with the ACL 118 and stored in the hosted storage service 120 or in other services (not shown). The resource encryption key itself has been encrypted by the keystore 109. The encrypted key can also carry associated metadata that is cryptographically bound to the key itself. Such keys are referred to as wrapped keys. From the point of view of the interface backend 108, the wrapped keys can be opaque resources. To obtain the cleartext key of a wrapped key for use (e.g., to encrypt or decrypt a data resource,) the interface backend 108 can provide the wrapped key and client authentication credentials to the keystore 109. The keystore 109 can verify, based in part on the wrapped key's metadata, that the provided authentication credential is sufficient to authorize release of the key, and if so, can return the unwrapped key to the interface backend 108. The interface backend 108 can use the key to encrypt or decrypt the data resource and then can discard the key.

In various implementations, the group exercising administrative control of the interface backend 108 and the group exercising administrative control over the keystore 109 may be different. This may provide greater security for the stored data because two parties would need to cooperate to access resource encryption keys.

In some examples, the resource encryption key is a symmetric key that can be used to both encrypt and decrypt a resource. A wrapped key can have associated metadata indicating multiple users or groups authorized to access the cleartext key.

In some cases, the keystore 109 can copy a wrapped key and rewrap the key for a different principal (e.g., containing different metadata). This may be considered the basis for the sharing of resources using a transitive trust model, which means a user must first have access to a resource before he or she can share that resource with another. As an example, the interface backend 108 may receive a request from a first user to share a wrapped key (or a resource encrypted with a wrapped key) with a second user. The interface backend 108 can retrieve the wrapped key from an ACL 118, and send, to the keystore 109, the wrapped key, authentication credentials for the first user and a user identifier for the second user. They keystore 109 can unwrap the wrapped key, ensure that the first user's authentication credentials match the wrapped key's user identifier, and rewrap the wrapped key with the second user's identifier. The keystore 109 can return the new wrapped key to the interface backend 108, who can store the new wrapped key in the ACL 118 in association with the second user.

The resource encryption key can be generated by, for example, the interface backend 108 and/or the keystore 109. For example, the interface backend 108 can generate random or pseudo-random data to use as the resource encryption key. In another example, the interface backend 108 can request a new resource encryption key from the keystore 109, and the keystore 109 can return random or pseudo-random data for use as the resource encryption key.

Alternatively, the interface backend 108 can request a resource encryption key from the keystore 109. For example, the interface backend can identify a seed value from a data resource 114 to be encrypted, and send that seed value to the keystore 109. The keystore can generate a resource encryption key from the seed value, and return it to the interface backend.

In some implementations, the keystore 109 can use a deterministic process to produce resource encryption keys from seeds. That is, the resource encryption key returned by the keystore 109 may always be the same for a provided seed value. In these implementations, if the interface backend 108 uses a deterministic encryption technique to encrypt the data resources 114, identical data resources 114 will have identical ciphertexts.

In this case, the hosted storage system 120 may be designed to identify and deduplicate data resources 114 that are identical. For example, if the hosted storage system 120 stores email attachments, it may be likely that many emails may contain identical attachments (e.g. a popular video, image files in HTML newsletters). If the interface backend 108 uses the attachment data resources 114, or a hash calculated from the data resources 114, as seed values, the resultant resource encryption keys generated by the keystore 109 will be identical for each identical data resource 114. If the interface backend 108 uses a deterministic encryption algorithm to encrypt the data resources 114, the resultant cypertext of the encrypted data resources 114 can be identical. With multiple copies of identical encrypted data resources 114 in the datastores 112, the interface backend can perform deduplicating processes to reduce the storage space used by the identical encrypted data resources 114. For example, if an encrypted data resource 114 is identical to another encrypted data resource 114, the interface backend 108 may delete the extra copy and replace it with a pointer to the other instance of the encrypted data resource 114.

There are other cases in which the interface backend 108 may request a resource encryption key from a seed value from the keystore 109. For example, the interface backend 108 may use user authentication data as a seed value. They keystore 109 can require that the user be authenticated by the keystore 109 before supplying a resource encryption key based on user authentication data. When storing user preferences as data resources 114, the interface backend 108 can use that user's authentication data as a seed value.

The storage backend 110 can contain multiple datastores 112a-112c. Although three datastores 112 are shown, more or fewer are possible. Each of the datastores 112a-112c can store data resources 114a-114c in a particular format. For example, data store 112a can store a data resource 114a as a Binary Large Object (BLOB), data store 112b can store a data resource 114b in a distributed file system (e.g., Network File System), and data store 112c can store a data resource 114c in a structured data format such as a database (e.g., MySQL).

In some implementations, the hosted storage system 120 can receive a request to encrypt data from one user using another user's wrapped key. For example, the client application 103 can upload a data file and a wrapped key to the hosted storage service 120 with a request to encrypt the data file with the resource encryption key in the wrapped key. In this example, the user of the client application 103 need not be the user specified in the wrapped key's user identifier. Here, the keystore 109 can act like a so-called "encryption oracle" that provides similar functionality as that found in a public key cryptography system.

The interface backend 108 can send the received data file and the wrapped key to keystore 109 with a request to encrypt the data file with the wrapped key. The keystore 109 can unwrap the wrapped key and use the resource encryption key to encrypt the data file. The wrapped key may be discarded by the keystore 109, and the encrypted data file can be returned to the interface backend 108. The interface backend 108 can then return the encrypted data file to the client application 103. As such, the user of the client application 103 can receive the encrypted data file, without ever having access to the resource encryption key within the wrapped key.

Figure 1B:
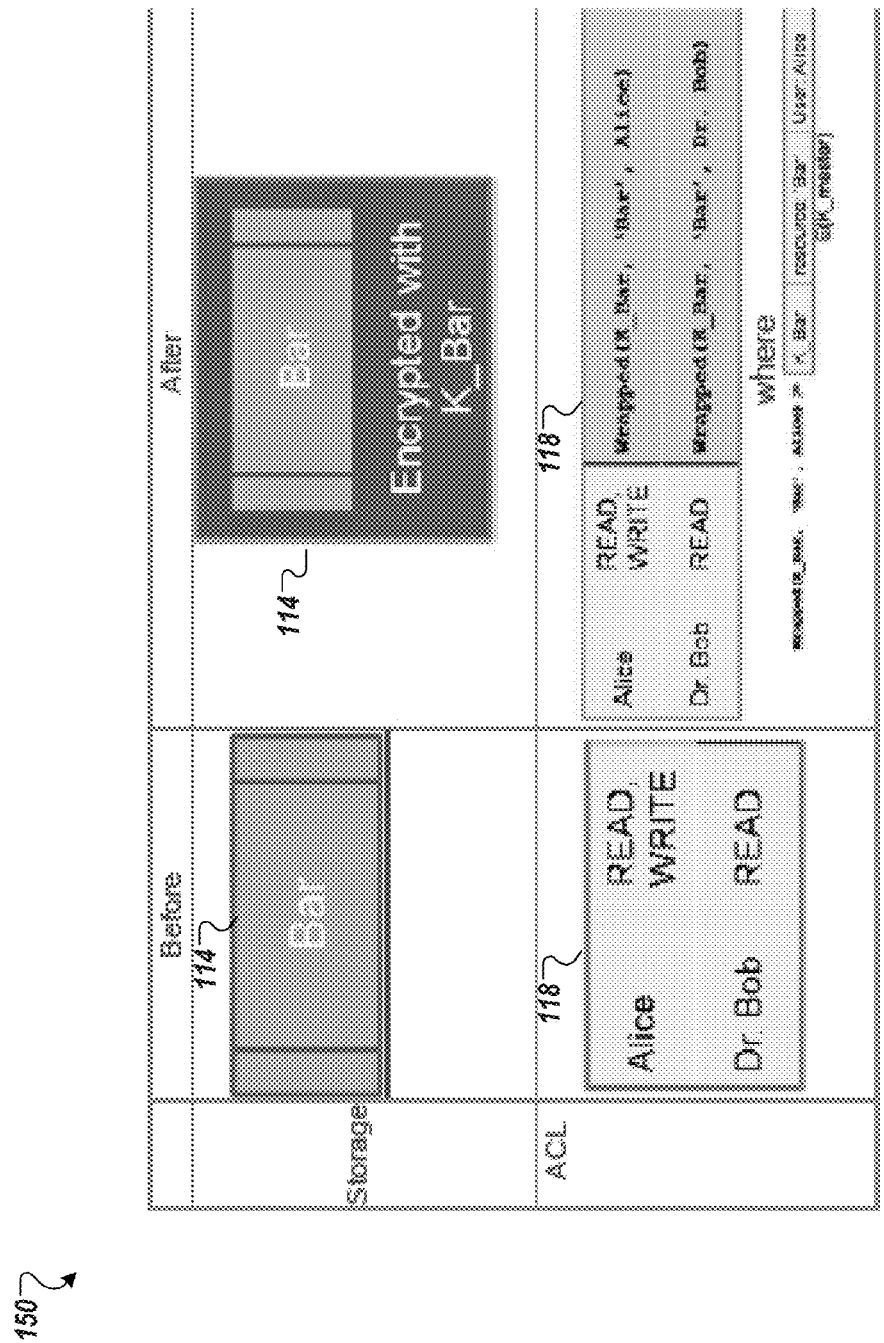
FIG. 1B is a block diagram showing an example of a wrapped key scheme.

FIG. 1B is a block diagram showing an example of a wrapped key scheme 150 that may be used, for example, in the system 100. The scheme 150 provides for a system of cryptographic keys that are secret and inaccessible to the hosted storage service 120, which stores the wrapped keys. Wrapped keys are encrypted and thus unusable in their base state. Wrapped keys are useful for granular access control. The scheme 150 permits creation and cataloging of keys at the same level of detail as access control lists used in data storage systems. Wrapped keys may be stored on disk near the data that they are used to encrypt, which may provide good performance and availability in data storage systems.

The data resource 114 is any resource that a system operator may want to protect via encryption. An ACL 118 is associated with the data resource 114 and describes the access permissions for the data resource 114. Here, a user "Alice" has READ and WRITE access, and a user "Dr. Bob" has READ access.

A resource encryption key, K_Bar, can be generated by, for example, the interface backend 108 or the keystore 109 and used to encrypt the data resource 114. The ACL 118 can be modified to store a wrapped key for each user entry. Each wrapped key can contain the resource encryption key K_Bar, metadata identifying the data resource 114, and user identification information. Each of the wrapped key is generated by the keystore 109 using a master key, K_Master.

The user identification information may be associated with a single user (e.g., Alice or Dr. Bob, as shown) or with a group of users. For example, user identification information for wrapped keys can identify any of the scopes for the ACL 118 described previously in Table 3, including Service Group ID, Group-Restricted Key, All Service Users, and All Users.

The encrypted data resource 114 and ACL 118 may be stored together, for example in adjacent memory locations, which may result in the data resource 114 and the associated wrapped keys being stored together, minimize memory reading operations. Alternatively, the data resource 114 and ACL 118 may be store separately, for example in a datastore 112 and metadata 116. When one of the users, Alice or Dr. Bob, attempt to access the encrypted data resource 114, the wrapped key and the user's authentication credentials can be sent to the keystore 109. If the sent authentication credentials correspond to the user identifier (or group identifier) in the wrapped key, the keystore 109 can return the resource encryption key K_Bar in unencrypted form to the interface backend 108, and the encrypted data resource 114 can be decrypted.

The ACL 118 can contain one entry per principal, with one wrapped key per entry. Each wrapped key can be completely decoupled from other wrapped key and entries in the same ACL 118. That is, a change to one entry and/or wrapped key does not affect the other wrapped keys. As such, access to the data resource 114 can be managed at a granular level by adding, removing, or editing individual ACL 118 entries. For example, to remove access for the Dr. Bob user, the interface backend 108 can delete the Dr. Bob entry in the ACL 118—no adjustment to the other entries in the ACL 118 or to the data resource 114 may be needed.

In some implementations, a wrapped key can be stored in the ACL 118 for invited and/or shared users. For example, if Alice would like to share the data resource 114 with other principals, the interface backend 108 can create an entry in the ACL 118 for other users. The interface backend 108 can request from the keystore 109 a wrapped key for the data resource 114 containing a secret token (e.g., a random character string). The hosted storage system 120 can provide the secret token to Alice to distribute, or can distribute the secret token on Alice's behalf. For example, the hosted storage system 120 can generate an email for Alice that invites the recipients to access the data resource 114 via a URI that has the secret token embedded. The URI can be an address of a request to the hosted storage system 120 to access the data resource 114.

The interface backend can send the secret token wrapped key and the received secret token to the keystore 109. If the wrapped secret token and the received secret token match, the keystore can return the resource encryption key, permitting the interface backend to decrypt and provide the data resource 114.

In some implementations, the secret token wrapped key can also contain a user identifier, for example if Alice intends to only share the data resource 114 with a particular principal. In these cases, the keystore 109 can verify the user authentication credentials of the requesting user, as well as the secret token, in order to return the resource encryption key.

Figure 2:
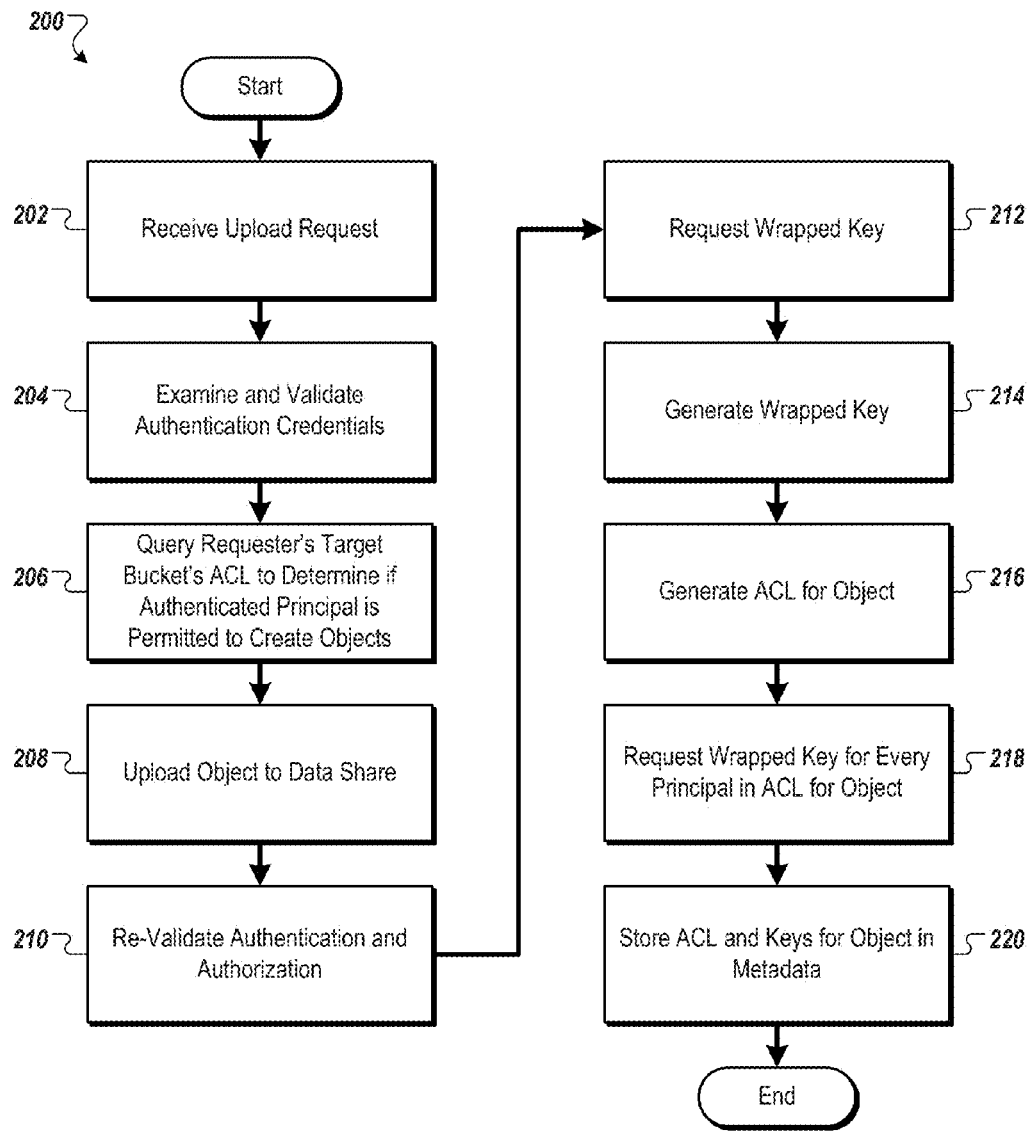
FIG. 2 is a flow chart showing an example of a process for storing data in a hosted storage service.

FIG. 2 is a flow chart showing an example of a process 200 for storing data in a hosted storage service. The process 200 can be performed by, for example, the interface frontend 106 and the interface backend 110, and for clarity of presentation, the description that follows uses the system 100 as the basis for describing the process. However, another system, or combination of systems, may be used to perform the process 200.

A request is received by the interface frontend 106 from the client application 103 to store a resource (202). The request can include a HTTP PUT or POST request, an authentication credential that authenticates the principal (entity) making the request, a data resource, and a target for the resource consisting of a bucket and data resource name. In some examples, the authentication credentials can include an interoperable authentication header, token, or cookie. The interface frontend can make a RPC to the backend 108 including the request headers.

The interface backend 108 can examine and validate the authentication credentials (204). For example, native credentials (e.g., user ID, token) can be validated using internal validation features of the hosted storage service 120. External credentials (e.g., user names and passwords for another system) can be sent to the associated external system for validation.

The interface backend 108 can query the request's target bucket's ACL 118 to determine if the authenticated principal is permitted to create a resource in the bucket (206). For example, the principal or a group the principal is a member of can have the WRITE or FULL_CONTROL role assigned in the bucket's ACL 118, which would allow the principal to create a resource in the bucket. If the principal is not authorized to create a resource, the request is denied.

Otherwise, the interface backend 108 uploads the resource to the target bucket with the target data resource name to a datastore 112 (208). In some examples, each bucket is associated with only a single datastore 112, and specifying a target bucket specifies a datastore 112. In some examples, the interface backend 108 can examine the data resource or use a parameter in the RPC from the interface frontend 106 to determine which datastore 112 to store the resource in, with associated metadata 116 indicating the location of the resource (that is, the particular datastore the resource is stored in and the resource's location in that datastore).

The interface backend 108 can encrypt the resource using a resource encryption key. In some examples, the interface backend 108 can perform this encryption before or after uploading the resource to the target bucket. The interface backend 108 can generate the resource encryption key, for example by sampling a pseudo-random number generator or calculating a hash value of data such as the resource or an input stream. Alternatively, the interface backend can generate a seed value and request a resource encryption key from the keystore 109 based on that seed value. Example seeds can include, but are not limited to user identifier (e.g. a userID or principalID), scope values, resource identifiers, and arbitrary byte strings.

The interface backend 108 re-validates the principal's authentication and authorization (210). To support long-running uploads, expiry times of authentication credentials can be temporarily ignored, and instead the action 204 can be substantially repeated.

The interface backend 108 generates a new resource key request to the keystore 109 for a wrapped key for the newly-uploaded resource (212). The request can include the resource encryption key, a resource identifier for the newly-uploaded resource, and a user identifier for the principal that uploaded the resource. The keystore 109 generates and encrypts a wrapped key (214) and can provide the wrapped key to the interface backend 108. The wrapped key can include the resource encryption key, resource identifier, and user identifier in the request from the interface backend 108.

The interface backend 108 creates an ACL 118 representing the access control list for the newly created resource (216). In some example, a default ACL 118 is used or an ACL 118 can be specified by the request from the client 102.

The interface backend 108 generates a new wrapped key request to the keystore 109 for a wrapped key for every principal (user or group) in the ACL 118 with permissions to read the resource or modify the resource's ACL 118 (218). Each new wrapped key is tied to a single principal (user or group), and contains the resource identifier and resource encryption key used to encrypt the resource.

For example, the request received by the interface frontend 106 from the client application 103 may indicate one or more other principals that should have shared access to the resource. To create wrapped keys for each of the other principals, the interface backend 108 can send, to the keystore 109, a wrapped key, authentication credentials for the principal that uploaded the resource, and a user identifier for a different principal. The keystore 109 can unwrap the key, verify that that the received authentication credentials match the wrapped key's user identifier, and rewrap the key with the user identifier for the different principal. The keystore 109 can then return the new wrapped key for the different principal to the interface backend 108.

The interface backend 108 stores the resource's ACL 118 and wrapped keys in the resource's metadata 116 (220). The resource encryption key or keys can be discarded by the interface backend 108.

Figure 3:
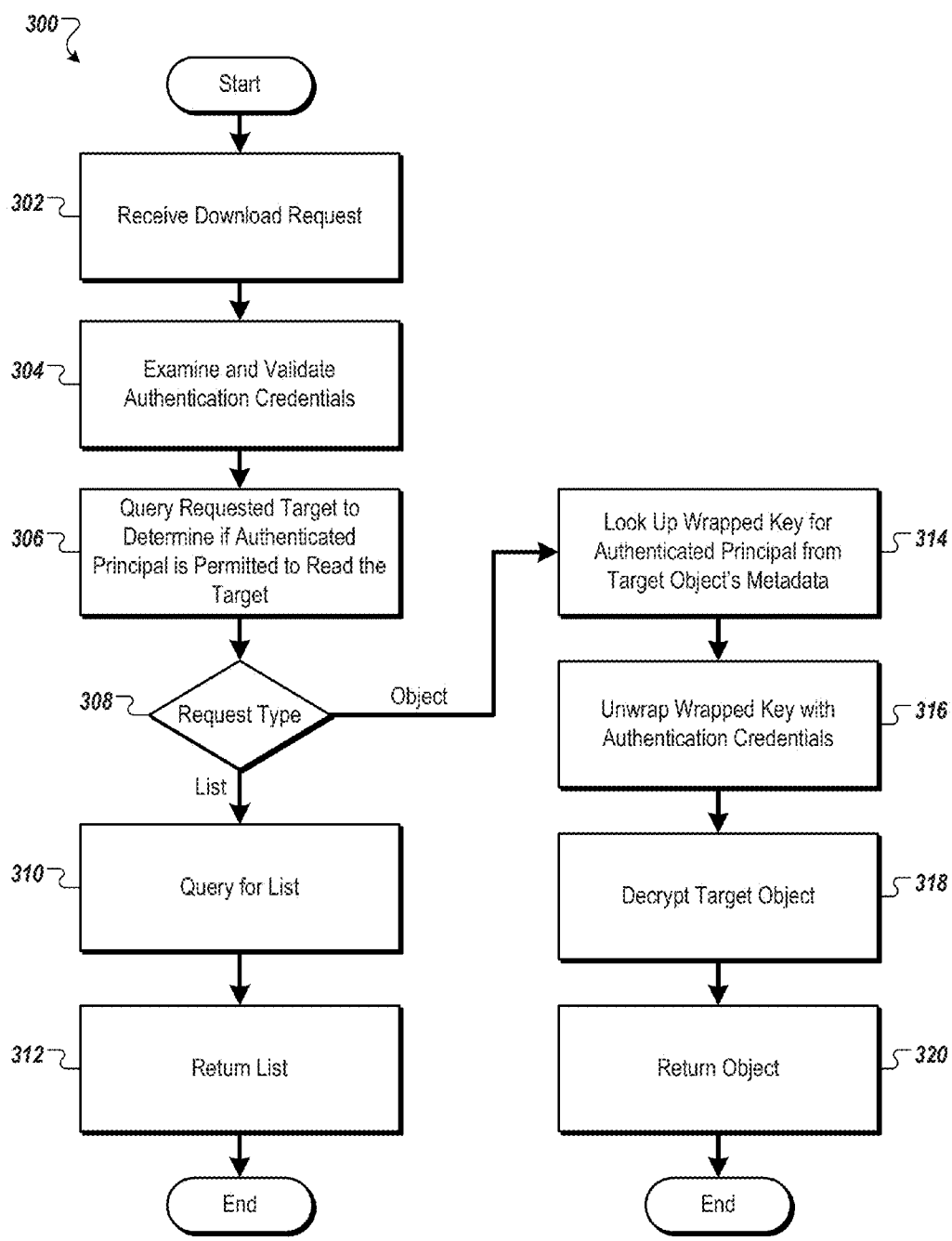
FIG. 3 is a flow chart showing an example of a process for providing data in a hosted storage service.

FIG. 3 is a flow chart showing an example of a process for providing data in a hosted storage service. The process 300 can be performed by, for example, the interface frontend 106 and the interface backend 110, and for clarity of presentation, the description that follows uses the system 100 as the basis for describing the process. However, another system, or combination of systems, may be used to perform the process 300.

A request is received by the interface frontend 106 from the client application 103 to download a resource (302). The request can include a HTTP GET request, an authentication credential that authenticates the principal (entity) making the request, and a target consisting of a bucket (and optionally data resource) name. In some examples, the authentication credentials can include an interoperable authentication header, token, or cookie. The interface frontend can make a RPC to the backend 108 including the request headers.

The interface backend 108 examines and validates the authentication credentials included in the request (304). For example, native credentials (e.g., user ID, token) can be validated using internal validation features of the hosted storage service 120. External credentials (e.g., user names and passwords for another system) can be sent to the associated external system for validation.

The interface backend 108 queries the request's bucket or resource ACL 118 to determine if the authenticated principal is permitted to read the target (306). For example, the principal or a group the principal is a member of can have the READ, WRITE or FULL_CONTROL role assigned, which would allow the principal to read or otherwise access the target. If the principal is not authorized to read or access the resource, the request is denied.

Otherwise, the interface backend 108 determines if the request is for a bucket or for a resource (308). If the request is for a bucket, the interface backend 108 queries for a list of the bucket's contents (310) and the listing is returned to the client application 103 (312).

If the request is for an resource, the interface backend 108 looks up the appropriate wrapped key for the given authenticated requestor from the resource's metadata 116 (314). The interface backend 108 sends the wrapped key and the authentication credentials to the keystore 109, which can return the decrypted resource encryption key to the interface backend 108 (316). The interface backend 108 can fetch and decrypt the target resource (318) to be returned to the client application 103 (320).

Figure 4:
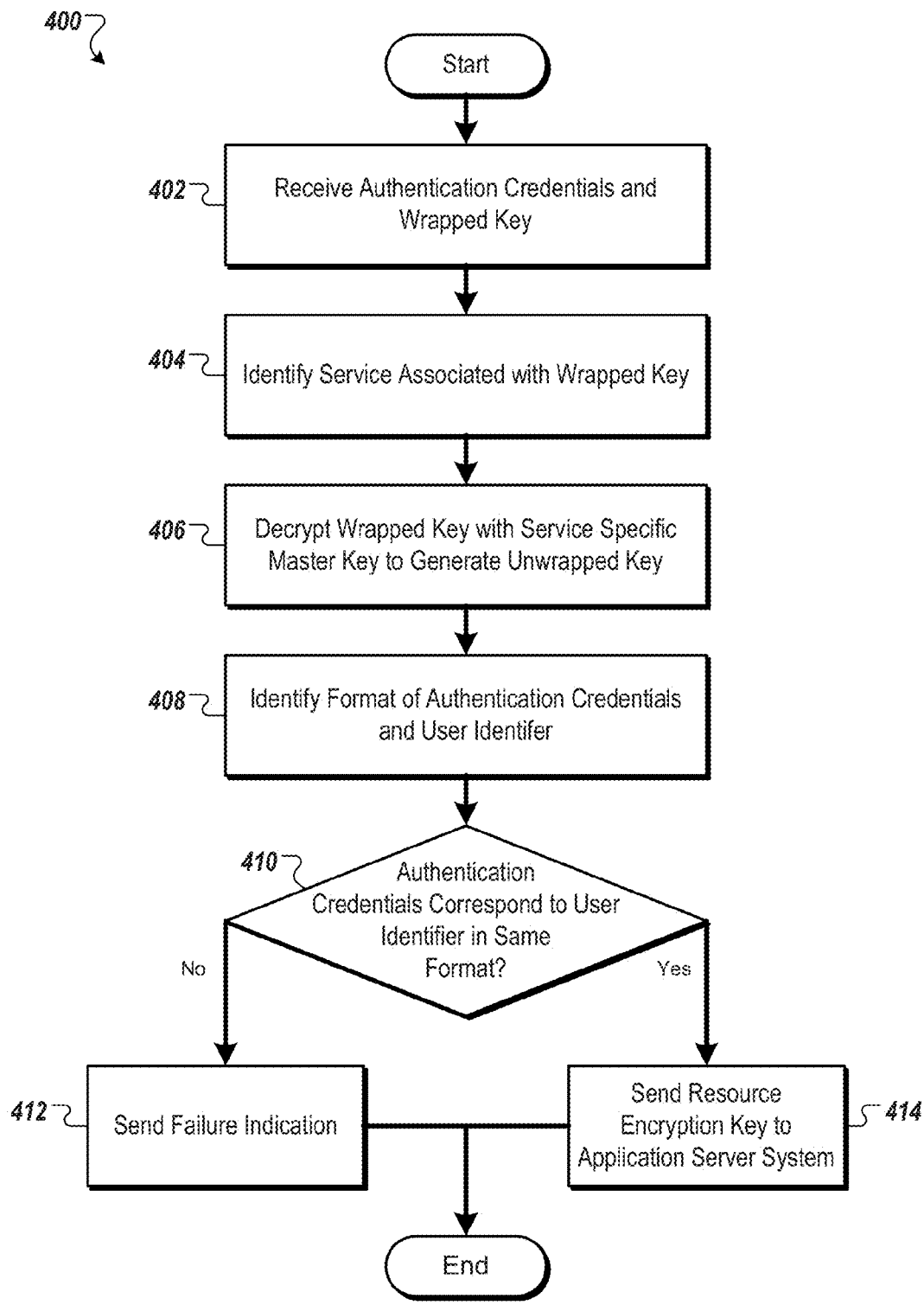
FIG. 4 is a flow chart showing an example of a process for unwrapping a wrapped key.

FIG. 4 is a flow chart showing an example of a process 400 for unwrapping a wrapped key. The process 400 can be performed by, for example, the keystore 109, and for clarity of presentation, the description that follows uses the system 100 and the scheme 150 as the basis for describing the process. However, another system, or combination of systems, may be used to perform the process 400.

Authentication credentials and a wrapped key are received at a key server system from an application server system (402). For example, the keystore 109 can receive authentication credentials and a wrapped key from the interface backend 108. The authentication credentials can specify one or more users, and may take the form of a variety of formats. In one or more implementations, wrapped keys may contain data that is only accessible by an application server with valid authentication credentials.

The wrapped key includes a resource identifier, a resource encryption key, and a user identifier that have been encrypted using a master key. The resource identifier identifies a resource encrypted with the resource encryption key and the user identifier identifies a user that is permitted to use the resource encryption key to decrypt the resource. For example, the resource identifier can describe a resource with which the resource encryption key is associated. Resource ID, file pathnames, and universal resource locators are all examples of resource identifiers. The resource encryption key can be the cryptographic key that has been, or will be, used to encrypt the resource identified by the resource identifier. For the wrapped keys in the ACL 118, the resource encryption key is K_Bar, the resource identifier is "Bar", and the user identifier is either Alice or Dr. Bob.

In some implementations, the authentication credentials are a character string embedded in a uniform resource identifier (URI). For example, some user authentication schemes can produce a unique character string for an authorized user. That character string can be included in to URI request to identify a user associated with the request. A service associated with the wrapped key is identified (404). For example, in addition to a wrapped key and authentication credentials, a service identifier may be received. The wrapped key is decrypted with a master key associated with the service (406). For example, the keystore 109 may store a collection of master keys, one per service, which are used for encrypting and decrypting the wrapped keys associated with a single service. After identifying the service, the keystore 109 may access, based on the identified service, the master key associated with the identified service and use the master key to decrypt the wrapped key. For instance, keystore 109 may identify, based on the identified service, the master key associated with the service, access the identified master key, and use the accessed master key to decrypt the wrapped key. Likewise, when wrapping keys, keystore 109 may identify the service, identify, based on the identified service, the master key associated with the service, access the identified master key, and use the accessed master key to wrap the key. In other implementations, the same master key may be used for different services.

The format of the authentication credentials and user identifier are identified (408). The keystore 109 may recognize many authentication formats, and the hosted storage system 120 may use one or more of those formats to authenticate users and identify principals in the ACLs 118. For example, the hosted storage system 120 may use its own native authentication system, and may also allow users of a third party authentication system use credentials from that third party authentication system. In this example, entries in the ACLs 118 and in wrapped keys may be in either the native or third party format. The keystore 109 may, as a preliminary authentication action, determine that the format of the authentication credentials and the user identifier are the same or compatible. The keystore 109 determines if the received authentication credentials correspond to the accessed user identifier according to the identified format (410). For example, the keystore 109 may use the identified format to determine the processes needed to compare the authentication credentials and user identifier. For some formats, the keystore 109 can provide the authentication credentials and user identifier to a third party authentication system and receive an indication of correspondence. For some other formats, the keystore 109 can perform the determination directly by selecting a format-appropriate comparison function, and using the authentication credentials and user identifier as parameters for the function. For example, some formats of authentication credentials and user identifier may be comparable by determining if both consist of the same data (e.g. character string, cookie). If both consist of identical data, then they can be considered to correspond. Some formats may require some pre-processing of the authentication credentials and/or user identifier, for example to convert the authentication credentials into the format of the user identifier, or vice-versa.

In some implementations, the user identifier may indicate no more than one user. For example, in the ACL 118 of FIG. 1B, each wrapped key user identifier indicates only one user, Alice or Dr. Bob. In this case, when more than one user is able to access the data resource 114, multiple wrapped keys, one for each user, are stored in the ACL 118.

In some implementations, the user identifier and/or the authentication credentials may indicate multiple users in a group. That is, the user identifier acts as a group identifier when used in relation to a group. For example, Table 3 lists some example scopes that include groups of multiple users. When the keystore 109 is determining if the authentication credentials correspond to the group specified in the user identifier, the keystore may determine that the authentication credentials belong to a group identified by the user identifier, instead of just strictly matching the user identifier.

If the received authentication credentials do not correspond to the accessed user identifier, a failure indication is sent (412). For example, the keystore 109 can return to the interface backend 108 an error or failure message that specifies that the authentication credentials do not match the user identifier in the received wrapped key.

If the received authentication credentials do correspond to the accessed user identifier, the resource encryption key is sent in unencrypted form to the application server system (414). For example the keystore 109 can transmit to the interface backend 108 the resource encryption key in unencrypted form. The interface backend 108 can then use the resource encryption key, such as described in the processes 200 and 300. In some implementations, communication between the keystore 109 and the interface backend 108 can use an encrypted transfer protocol such as Transport Layer Security (TLS) so that the encryption key is encrypted in transport.

Figure 5:
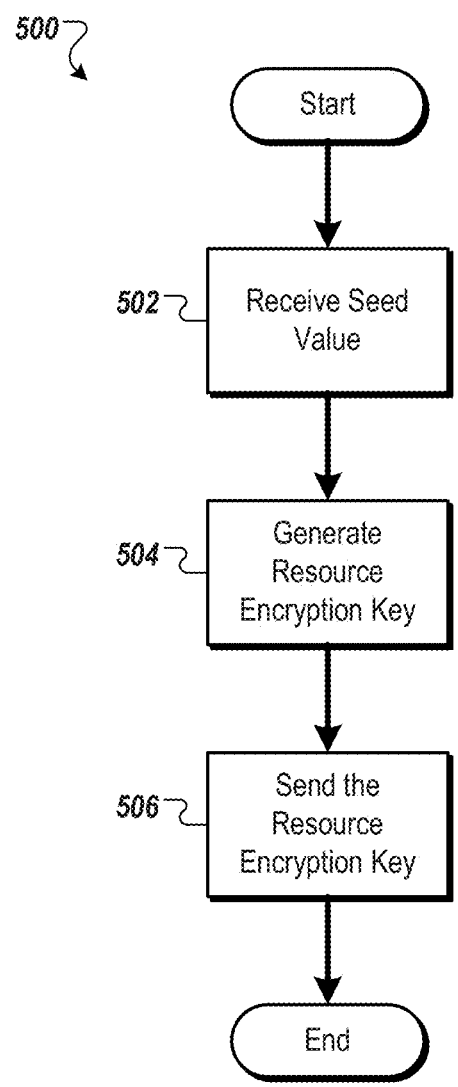
FIG. 5 is a flow chart showing an example of a process for creating a resource encryption key from a seed value.

FIG. 5 is a flow chart showing an example of a process for creating a resource encryption key from a seed value. The process 500 can be performed by, for example, the keystore 109, and for clarity of presentation, the description that follows uses the system 100 and the scheme 150 as the basis for describing the process. However, another system, or combination of systems, may be used to perform the process 500.

A seed value is received from the application server system (502). For example, the interface backend 108 can send a seed value to the keystore 109. The seed value can be based on data available to the interface backend 108 and/or arbitrary data. For example, for use in encrypting user preferences, the interface backend 108 can use some data relating to each user as a seed value for a wrapped key for each user's preferences. Additionally, an arbitrary character string can be appended to the seed data by the interface backend 108. In another case, the seed can be based on the resource that is to be encrypted. For example, the interface backend 108 can send a copy of the resource to the keystore 109 to be used as a seed value, or a hash of the resource may be calculated by the interface backend 108 and send to the keystore 109 to be used as a seed value.

The resource encryption key is generated from the seed value (504). For example, the keystore 109 can use the seed value and a master key as parameters to a pseudo random function, such as a keyed cryptographic hash function, to generate a resource encryption key. Most or all one-way functions that can be used to generate the resource encryption key are deterministic algorithm. Assuming keyed cryptographic hash function is deterministic, the resource encryption key is determined by the seed value, and any set of wrapped keys with identical seed values will also have identical resource encryption keys.

The resource encryption key is sent to the application server system (506). For example, the keystore 109 can return the newly generated resource encryption key to the interface backend 108 for use in encrypting data resources 114.

Figure 6:
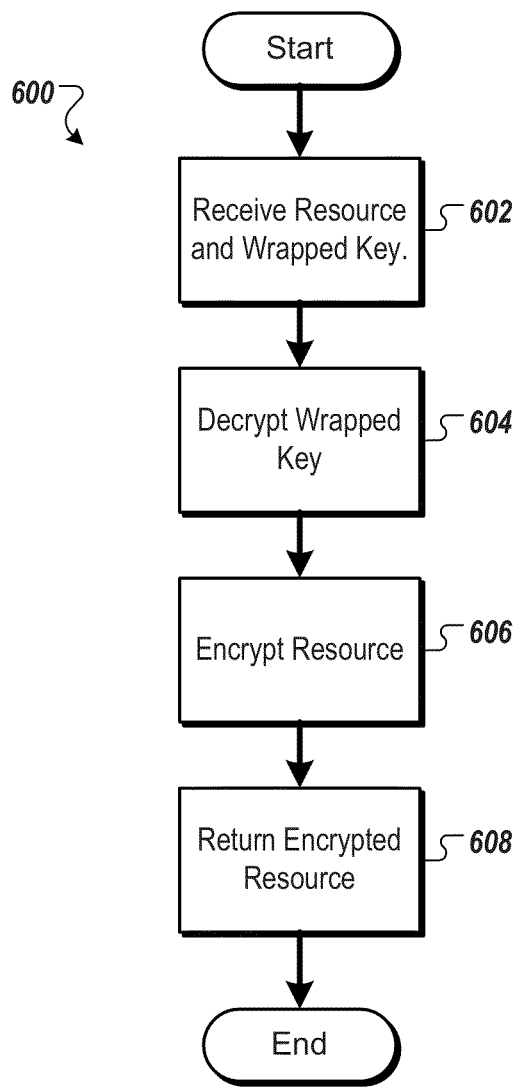
FIG. 6 is a flow chart showing an example of a process for using a keystore to facilitate user-to-user sharing of encrypted data.

FIG. 6 is a flow chart showing an example of a process 600 for using a keystore to facilitate user-to-user sharing of encrypted data. In this process, a keystore can use a wrapped key to encrypt data from one user using another user's wrapped key. The process 600 can be performed by, for example, the keystore 109, and for clarity of presentation, the description that follows uses the system 100 and the scheme 150 as the basis for describing the process. However, another system, or combination of systems, may be used to perform the process 600.

The process 600 can be used to encrypt data with a wrapped key by any actor, even if the actor is not authorized to access the unwrapped key. This process can mimic functionality available in public key encryption schemes. In one or more implementations, wrapped keys may be used to facilitate public key encryption functionality without requiring the computation of public key/private key pairs.

A resource in unencrypted form and a wrapped key are received from an application server system (602). For example, the keystore 109 can receive from the interface backend 108 an encryption request that includes an encrypted resource and a wrapped key. The request need not specify that the interface backend 108 access or receive the resource encryption key from the wrapped key, only that the keystore 109 use it to encrypt the resource.

The wrapped key is decrypted to access the resource encryption key (604). For example, the keystore 109 can decrypt the wrapped key to gain access to the resource encryption key in the wrapped key. The resource is encrypted from unencrypted form into encrypted form with the resource encryption key (606). For example, keystore 109 can encrypt the resource using the accessed resource encryption key. Once the resource is encrypted, the keystore 109 may discard the wrapped key and the resource encryption key.

The encrypted resources are sent to the application server system (608). For example, the keystore 109 can return the encrypted resource to the interface backend 108, which may forward the encrypted resource to an external system or store the encrypted resource, as previously described.

Once encrypted, the user identified in the wrapped key used encrypt the resource may access the resource. For example, if the encrypted resource is stored in a datastore 112 by the hosted storage system 120, the identified user may log into the hosted storage system 120 and access the encrypted resource. The interface backend can send, to the keystore 109, the user's authentication credentials and the wrapped key associated with the resource. Since the user's authentication credentials would match the user identifier in the wrapped key, the keystore 109 can return the resource encryption key to the interface backend. With the resource encryption key, the interface backend 108 can decrypt the resource and provide it to the user.

In some implementations, a keystore that performs the process 600 may later perform the process 400. For example, an application server system can provide hosted email service to users. Email resources can be received by that application server even when the recipient user is not logged in. Since the recipient user may not logged in, authentication credentials for that user may not available to the application server system, and the application server system may not be able to successfully request the resource encryption key from the user's wrapped key. In order to encrypt the email for storage until it can be accessed by the user, the application server system can send the email and the user's wrapped key to a keystore. The keystore can perform the process 600 and return the email in encrypted form back to the application server system.

Later, the user may log in, making the user's authentication credentials available to the application server system. The application server system can send the user's authentication credentials to the same keystore, along with the user's wrapped key. The keystore can perform the process 400 and return the resource encryption key from the wrapped key, permitting the application server system to decrypt the user's e-mail.

Another implementation that uses the same keystore to perform the processes 400 and 600 could include a first user creating and giving a resource to a second user. For example, a financial institution may us an application server system to generate reports or statements for each account holder. Each report or statement may be encrypted by a keystore using the process 600, and stored on the application server system. When a user attempts to access the statement, the application server system can send a request to the same keystore to perform the process 400 so that the application server system can access the resource encryption key and decrypt the statement for the user.

In some implementations, different keystores can perform the process 400 and 600. For example, a research firm may use an application server system to compile statistical data that includes sensitive information (e.g., medical, financial, privacy, or security information). The research firm's application server system may request a local keystore to encrypt the sensitive information with a client specific wrapped key using the process 600. The research firm may transmit the encrypted data to the client through any suitable type of communication channel, including unsecure channels such as standard email, parcel delivery, or via a minimally secured internet connection. The client can receive the encrypted information at a different application server system, which may offer different serves than the research firm's application server system, without ever exposing the plaintext of the sensitive information to any other parties. The client's application server system can then request a different keystore to perform the process 400 in order to access the resource encryption key to decrypt the sensitive information.

Figure 7:
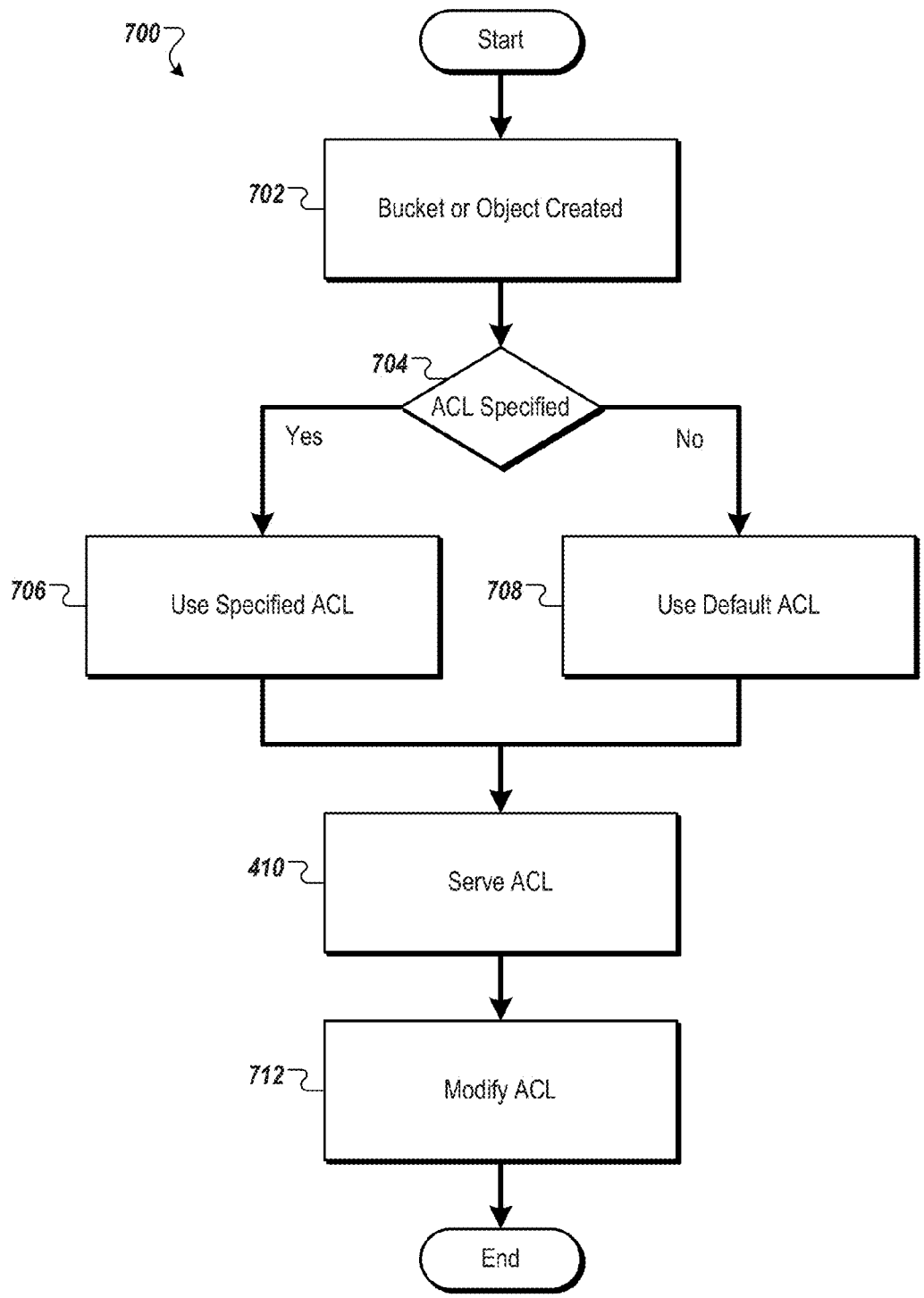
FIG. 7 is a flow chart showing an example lifecycle of an access control list.

FIG. 7 is a flow chart showing an example lifecycle 700 of an ACL 118. Although the steps of the lifecycle 700 show an order of steps, it is not implied that each step leads directly to another. The steps shown are a listing of possible steps that may be performed on an ACL 118 in roughly chronological order. The actual order, number, and kind of steps will be dependent on implementation details and usage of the hosted storage system 120.

A bucket or resource is created by the backend interface 108 based on requests from the client application 103 (702). The client request can include a bucket name, a resource name, and/or an ACL 118. The principal requesting the new bucket or resource is authenticated and made the owner of the bucket or resource.

If an ACL 118 is specified in the request (704), the specified ACL 118 is associated with the bucket or resource. If the specified ACL 118 does not include a {scope, role} pair specifying the principal having FULL_CONTROL, one such {scope, role} pair can be added to the ACL 118. In one implementation, an ACL may be specified in a request by enumerating each scope and role pair to be included in the ACL, or may be specified by reference to the name of a pre-specified or "canned" ACL. A list of pre-specified or 'canned' ACLs 118 is shown in Table 4 Canned ACLs below. The canned ACLs 118 can be cataloged by the hosted storage system 120 and referenced by the client application 103 by name, rather than requiring the request enumerate each scope and role pair.

TABLE 4

Canned ACLs

| Canned ACL Name | {scope, permission} |
|---|---|
| private | {creating user or bucket owner, FULL_CONTROL} |
| public-read | {all users, READ} |
| | {bucket owner, FULL_CONTROL} |
| public-read-write | {all users, WRITE} |
| | {bucket owner, FULL_CONTROL} |
| authenticated-read | {all authenticated users, READ} |
| | {bucket owner, FULL_CONTROL} |
| bucket-owner-read | {bucket owner, READ} |
| [for resources only] | {resource owner, FULL_CONTROL} |
| bucket-owner-full-control | {bucket owner, FULL_CONTROL} |
| [for resources only] | {resource owner, FULL_CONTROL} |

If an ACL 118 is not specified in the request (704), a default ACL 118 can be used (708). For example, bucket and resource creation can default to the "private" canned ACL 118 for authenticated users. For resource creation by unauthenticated users, such as for new resources created in a "public-read-write" bucket, a default of "bucket-owner-full-control" can be used.

An ACL 118 can be served, for example, to a principal with READ, WRITE, or FULL_CONTROL of the associated bucket or resource (710). For example, a client application 103 can perform a HTTP GET to a target's URI with the query string ?acl to retrieve the ACL associated with the target. The ACL 118 can be serialized and returned to the client application 103.

The serialization may be defined, for example, by the following extended Backus-Naur form. Nonterminals appear in sans serif italics, terminals appear in Courier Bold, { } denote zero or more repetitions, [ ] enclose optional entities, separates alternatives, and ( ) denote grouping. The terminal symbols canonical-id, email-address, and domain are defined in English below:

access-control-list: <AccessControlList>owner entries</AccessControlList>
owner: <Owner>id</Owner>
entries: <Entries>entry {entry}</Entries>
entry: <Entry>(permission scope|scope permission)</Entry>
permission: <Permission>(READ|WRITE|FULL_CONTROL)</Permission>
scope: <Scope type=UserById>id</Scope>
|<Scope type=UserByEmail>email</Scope>
|<Scope type=GroupById>id</Scope>

|<Scope type=GroupByEmail>email</Scope>
|<Scope type=GroupByDomain><Domain>domain</Domain></Scope>
|<Scope type=AllUsers/>
|<Scope type=AllAuthenticatedUsers/>
id: <ID>canonical-id</ID>[<Name>text</Name>]
|[<Name>text</Name>]<ID>canonical-id</ID>
email:  <EmailAddress>email-address</EmailAddress>
[<Name>text</Name>]|[<Name>text</Name>]
<EmailAddress>canonical-id</EmailAddress>
text: {printable character excluding<and >}
canonical-id: 64 hex digits
email-address: standard RFC 822 email address
domain: standard RFC 822 domain specification A canonical-id or an email-address can identify a user or a group. A canonical-id is the encrypted service id for the user or group. Email addresses are a convenience for specifying canonical ids. In some implementations, the ACLs returned from the system always contain canonical ids. The <Name>text</Name>element may be used for information purposes only such that it is otherwise ignored by the system, and the system does not return it if there is no public name associated with the user or group.

An example serialized ACL 118 is shown below.
<AccessControlList>
<Owner>
<ID>a9a7b886d6fd24a52fe8ca5bef65f89a64e
0193f23000e241bf9b1c61be666e9</ID>
<Name>chriscustomer</Name>
</Owner>
<Entries>
<Entry><Permission>FULL_CONTROL</Permission>
<Scope type=UserById>
<ID>a9a7b886d6fd24a52fe8ca5bef65f89a64e
0193f23000e241bf9b1c61be666e9</ID>
<Name>chriscustomer</Name>
</Scope>
</Entry>
<Entry><Permission>FULL_CONTROL</Permission>
<Scope type=UserById>
<ID>79a59df900b949e55d96a1e698fbacedfd6e
09d98eacf8f8d5218e7cd47ef2be</ID>
<Name>Frank</Name>
</Scope>
</Entry>
<Entry><Permission>FULL_CONTROL</Permission>
<Scope type=UserById>
<ID>de019164ebb0724ff67188e243eae9 ccbebdde523717
cc312255d9a82498e394a</ID>
<Name>Jose</Name>
</Scope>
</Entry>
<Entry><Permission>READ</Permission><Scope
type=AllUsers></Entry>
</Entries>
</AccessControlList>

An ACL 118 can be updated, for example by a principal with WRITE or FULL_CONTROL of the associated bucket or resource (712). In some examples, a client must read, modify, and write an ACL 118 in order to update an ACL 118. In this example, the ACL 118 is served (710) as part of modification (712). In some implementations, a client application 103 can send ACL update requests to the hosted storage system 120.

FIG. 8 shows an example of a computing device 800 and a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a microdrive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method performed by one or more processors, the method comprising:
   receiving, from an application server system and at a key server system, a seed value;
   generating, at the key server system, a resource encryption key from the seed value;
   sending, from the key server system to the application server system, the resource encryption key such that the application server system is able to encrypt a resource using the resource encryption key;
   receiving, from the application server system and at the key server system, authentication credentials and a wrapped key, the wrapped key including a resource identifier, a resource encryption key, and a user identifier that have been encrypted using a master key, wherein the resource identifier identifies the resource encrypted with the resource encryption key and the user identifier identifies a user that is permitted to use the resource encryption key to decrypt the resource;
   decrypting the wrapped key to generate an unwrapped key that includes the resource identifier, the resource encryption key, and the user identifier in unencrypted form;
   accessing the user identifier from the unwrapped key;
   determining that the received authentication credentials correspond to the accessed user identifier; and
   in response to determining that the received authentication credentials correspond to the accessed user identifier, sending the resource encryption key in unecrypted form to the application server system such that the application server system can decrypt the resource using the resource encryption key in unencrypted form.

2. The method of claim 1, the method further comprising: identifying a service associated with the wrapped key; and
   wherein decrypting the wrapped key includes decrypting the wrapped key using a master key associated with the service.

3. The method of claim 1, the method further comprising:
   receiving, from the application server and at the key server system, a sharing request that includes i) the authentication credentials, ii) the wrapped key, and iii) a second user identifier;
   decrypting the wrapped key included in the request to generate the unwrapped key;
   accessing the user identifier from the unwrapped key;
   determining that the received authentication credentials correspond to the accessed user identifier; and
   in response to determining that the received authentication credentials correspond to the accessed user identifier:
      replacing the user identifier in the unwrapped key with the second user identifier;
      encrypting the unwrapped key to generate a second wrapped key; and
      sending the second wrapped key to the application server system.

4. The method of claim 1, wherein the user identifier indicates no more than one user.

5. The method of claim 1, the method further comprising:
   identifying a format of the authentication credentials and the user identifier; and
   determining that the received authentication credentials correspond to the accessed user identifier according to the identified format.

6. The method of claim 1, the method further comprising:
   encrypting the resource using the resource encryption key to generate an encrypted version of the resource;
   detecting duplicates of the encrypted version of the resource store in a storage system; and
   removing the detected duplicates from the storage system.

7. The method of claim 6 wherein removing the detected duplicates from the storage system comprises deleting the detected duplicates and replacing the deleted duplicates with a pointer to the encrypted version of the resource.

8. The method of claim 6 wherein encrypting the resource using the resource encryption key to generate the encrypted version of the resource comprises encrypting the resource using the resource encryption key and a deterministic encryption technique.

9. The method of claim 1 wherein the seed value is based on the resource.

10. The method of claim 9 wherein the seed value is a hash calculated from the resource.

11. A computer system comprising:
   a key server system comprising a processor and memory and configured to:
      receive, from an application server system and at a key server system, a seed value;

generate, at the key server system, a resource encryption key from the seed value;

send, from the key server system to the application server system, the resource encryption key such that the application server system is able to encrypt a resource using the resource encryption key;

receive, from the application server system and at the key server system, authentication credentials and a wrapped key, the wrapped key including a resource identifier, a resource encryption key, and a user identifier that have been encrypted using a master key, wherein the resource identifier identifies the resource encrypted with the resource encryption key and the user identifier identifies a user that is permitted to use the resource encryption key to decrypt the resource;

decrypt the wrapped key to generate an unwrapped key that includes the resource identifier, the resource encryption key, and the user identifier in unencrypted form;

access the user identifier from the unwrapped key;

determine that the received authentication credentials correspond to the accessed user identifier; and in response to determining that the received authentication credentials correspond to the accessed user identifier, send the resource encryption key in unecrypted form to the application server system such that the application server system can decrypt the resource using the resource encryption key in unencrypted form.

12. The system of claim 11, the key server system further configured to:
identify a service associated with the wrapped key; and
wherein decrypting the wrapped key includes decrypting the wrapped key using a master key associated with the service.

13. The system of claim 11, the key server system further configured to:
receive, from the application server and at the key server system, a sharing request that includes i) the authentication credentials, ii) the wrapped key, and iii) a second user identifier;
decrypt the wrapped key included in the request to generate the unwrapped key;
access the user identifier from the unwrapped key;
determine that the received authentication credentials correspond to the accessed user identifier; and
in response to determining that the received authentication credentials correspond to the accessed user identifier:
replace the user identifier in the unwrapped key with the second user identifier;
encrypt the unwrapped key to generate a second wrapped key; and
send the second wrapped key to the application server system.

14. The system of claim 11, wherein the user identifier indicates no more than one user.

15. The system of claim 11, wherein the key server system is further configured to:
identify a format of the authentication credentials and the user identifier; and
determine that the received authentication credentials correspond to the accessed user identifier according to the identified format.

16. The system of claim 11, wherein the application server is further configured to:
encrypt the resource using the resource encryption key to generate an encrypted version of the resource;
detect duplicates of the encrypted version of the resource store in a storage system; and
remove the detected duplicates from the storage system.

17. The system of claim 16 wherein, to remove the detected duplicates from the storage system, the application server is configured to delete the detected duplicates and replace the deleted duplicates with a pointer to the encrypted version of the resource.

18. The system of claim 16 wherein, to encrypt the resource using the resource encryption key to generate the encrypted version of the resource, the application server is configured to encrypt the resource using the resource encryption key and a deterministic encryption technique.

19. The system of claim 11 wherein the seed value is based on the resource.

20. The system of claim 19 wherein the seed value is a hash calculated from the resource.

21. A non-transitory computer readable medium storing instructions that, when executed by one or more processing devices, cause the one or more processing devices to perform operations including:
receiving, from an application server system and at a key server system, a seed value;
generating, at the key server system, a resource encryption key from the seed value;
sending, from the key server system to the application server system, the resource encryption key such that the application server system is able to encrypt a resource using the resource encryption key;
receiving, from the application server system and at the key server system, authentication credentials and a wrapped key, the wrapped key including a resource identifier, a resource encryption key, and a user identifier that have been encrypted using a master key, wherein the resource identifier identifies the resource encrypted with the resource encryption key and the user identifier identifies a user that is permitted to use the resource encryption key to decrypt the resource;
decrypting the wrapped key to generate an unwrapped key that includes the resource identifier, the resource encryption key, and the user identifier in unencrypted form;
accessing the user identifier from the unwrapped key;
determining that the received authentication credentials correspond to the accessed user identifier; and
in response to determining that the received authentication credentials correspond to the accessed user identifier, sending the resource encryption key in unecrypted form to the application server system such that the application server system can decrypt the resource using the resource encryption key in unencrypted form.

22. The medium of claim 21, the operations further including:
identifying a service associated with the wrapped key; and
wherein decrypting the wrapped key includes decrypting the wrapped key using a master key associated with the service.

23. The medium of claim 21, the operations further including:
receiving, from the application server and at the key server system, a sharing request that includes i) the authentication credentials, ii) the wrapped key, and iii) a second user identifier;
decrypting the wrapped key included in the request to generate the unwrapped key;
accessing the user identifier from the unwrapped key;
determining that the received authentication credentials correspond to the accessed user identifier; and in response to determining that the received authentication credentials correspond to the accessed user identifier:

replacing the user identifier in the unwrapped key with the second user identifier;

encrypting the unwrapped key to generate a second wrapped key; and sending the second wrapped key to the application server system.

24. The medium of claim 21, wherein the user identifier indicates no more than one user.

25. The medium of claim 21, the operations further including:

identifying a format of the authentication credentials and the user identifier; and determining that the received authentication credentials correspond to the accessed user identifier according to the identified format.

26. The medium of claim 21, the operations further including:

encrypting the resource using the resource encryption key to generate an encrypted version of the resource;

detecting duplicates of the encrypted version of the resource store in a storage system; and removing the detected duplicates from the storage system.

27. The medium of claim 26 wherein removing the detected duplicates from the storage system comprises deleting the detected duplicates and replacing the deleted duplicates with a pointer to the encrypted version of the resource.

28. The medium of claim 26 wherein encrypting the resource using the resource encryption key to generate the encrypted version of the resource comprises encrypting the resource using the resource encryption key and a deterministic encryption technique.

29. The medium of claim 21 wherein the seed value is based on the resource.

30. The medium of claim 29 wherein the seed value is a hash calculated from the resource.

* * * * *